US010853502B1

(12) United States Patent
Wu

(10) Patent No.: US 10,853,502 B1
(45) Date of Patent: Dec. 1, 2020

(54) SYSTEMS AND METHODS FOR REDUCING COMPUTATIONAL DIFFICULTY OF CRYPTOGRAPHIC OPERATIONS

(71) Applicant: MICRO FOCUS LLC, Santa Clara, CA (US)

(72) Inventor: Thomas J. Wu, Cupertino, CA (US)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 14/966,597

(22) Filed: Dec. 11, 2015

Related U.S. Application Data

(60) Provisional application No. 62/128,355, filed on Mar. 4, 2015.

(51) Int. Cl.
*G06F 21/60* (2013.01)
*H04L 9/06* (2006.01)

(52) U.S. Cl.
CPC .......... *G06F 21/602* (2013.01); *H04L 9/0618* (2013.01); *H04L 2209/24* (2013.01)

(58) Field of Classification Search
None
See application file for complete search history.

(56) References Cited

U.S. PATENT DOCUMENTS

| 5,727,065 A | 3/1998 | Dillon |
| 5,784,461 A | 7/1998 | Shaffer et al. |
| 6,182,216 B1 | 1/2001 | Luyster |
| 6,263,439 B1 | 1/2001 | Hondros et al. |
| 6,230,269 B1 | 5/2001 | Spies et al. |

(Continued)

FOREIGN PATENT DOCUMENTS

| EP | 1209550 | 5/2002 |
| WO | 02/51066 | 6/2002 |

(Continued)

OTHER PUBLICATIONS

T. Lookabaugh; Security analysis of selectively encrypted MPEG-2 streams; Tear 2003; colorado.edu; pp. 1-12.

(Continued)

*Primary Examiner* — Joseph P Hirl
*Assistant Examiner* — Hassan Saadoun

(57) ABSTRACT

Computing equipment may perform format-preserving encryption and decryption by partitioning an input string into first and second portions. The computing equipment may combine the first portion with the second portion after the second portion has been passed through a pseudorandom function using a format-preserving combination operation that requires inputs having a similar domain size. A data size adjustment engine may adjust the domain size of the output of the pseudorandom function to be similar to the domain size of the first string. In order to mitigate undesirable data overflows, the output of the pseudorandom function may be partitioned into a number of computationally simpler terms each having a modulo factor and a pre-computed constant value. The computing equipment may pre-compute the constant values in advance, thereby reducing the computational complexity required for performing the size adjustment operations without generating undesirable data overflows.

20 Claims, 10 Drawing Sheets

(56) References Cited

U.S. PATENT DOCUMENTS

| | | |
|---|---|---|
| 6,289,450 B1 | 9/2001 | Pensak et al. |
| 6,704,871 B1 | 3/2004 | Kaplan et al. |
| 6,836,765 B1 | 12/2004 | Sussman |
| 6,885,748 B1 | 4/2005 | Wang |
| 7,337,176 B1 | 2/2008 | Cheedella et al. |
| 7,353,388 B1 | 4/2008 | Gilman et al. |
| 7,401,232 B2 | 7/2008 | Ono et al. |
| 7,412,519 B2 | 8/2008 | Wang |
| 7,418,098 B1 | 8/2008 | Mattsson et al. |
| 7,522,723 B1 | 4/2009 | Shaik |
| 7,580,919 B1 | 8/2009 | Hannel et al. |
| 7,624,269 B2 | 11/2009 | Appenzeller et al. |
| 7,657,037 B2 | 2/2010 | Callas |
| 7,748,030 B1 | 6/2010 | Selberg et al. |
| 7,864,952 B2 | 1/2011 | Pauker et al. |
| 8,000,474 B1 | 8/2011 | Evans et al. |
| 8,001,585 B2 | 8/2011 | Hogan et al. |
| 8,028,169 B2 | 9/2011 | Yoshioka |
| 8,208,627 B2 | 6/2012 | Pauker et al. |
| 8,364,951 B2 | 1/2013 | Peterka et al. |
| 8,837,715 B2 | 9/2014 | Pastoriza et al. |
| 8,938,067 B2 | 1/2015 | Martin et al. |
| 8,948,375 B2 | 2/2015 | Burnett et al. |
| 8,958,562 B2 | 2/2015 | Spies et al. |
| 2002/0073202 A1 | 6/2002 | Wang |
| 2003/0028481 A1 | 2/2003 | Flitcroft et al. |
| 2003/0191719 A1 | 10/2003 | Ginter et al. |
| 2004/0086113 A1* | 5/2004 | Lauter .............. G06F 7/725 380/28 |
| 2005/0132070 A1 | 6/2005 | Redlich et al. |
| 2005/0262573 A1 | 11/2005 | Bo et al. |
| 2006/0015751 A1* | 1/2006 | Brickell ............ G06F 21/73 713/193 |
| 2006/0031923 A1 | 2/2006 | Kanai |
| 2006/0059149 A1 | 3/2006 | Dunki et al. |
| 2009/0310778 A1 | 5/2009 | Mueller et al. |
| 2009/0222393 A1* | 9/2009 | Ganai .............. G06F 17/11 706/46 |
| 2010/0111297 A1* | 5/2010 | Pauker ............ H04L 9/0687 380/37 |
| 2016/0241852 A1* | 8/2016 | Gamei ............ H04N 19/50 |

FOREIGN PATENT DOCUMENTS

| | | |
|---|---|---|
| WO | 03/001326 | 1/2003 |
| WO | 2006/10777 | 10/2006 |

OTHER PUBLICATIONS

Liskov et al., "Tweakable Block Ciphers" CRYPTO 2002 [online] [retreived on Jun. 29, 2010] <URL:http://www.cs.wm.edu/—milskov/pubs/lirvva053102.pdf>.

Naor et al. "On the Consruction of Pseudorandom Permutations: Luby-Rackoff Revisited". Journal of Cryptology, vol. 12 Issue 1, pp. 29-66. Jan. 1999.

J. Black et al. "Ciphers with Arbitrary Finite Domains", RSA Conference 2002, San Jose, CA, USA, Feb. 18-22, 2002, Proceedings, Lecture Notes in Computer Science, 2271 Springer 2002, ISBN 3-540-43224, pp. 114-130.

Thomas Stutz and Andreas Uhl, "On Format-Compliant Iterative Encryption of JPEG2000," Proceedings of the Eighth IEEE International Symposium on Multimedia (ISM '06), 2006.

J. Black and P. Rogaway, "Ciphers with Arbitrary Finite Domains," [online]. Feb. 12, 2001 <URL:eprint.iacr.org/2001/012.ps>.

Brightwell, M et al. "Using Datatype-Preserving Encryption to Enhance Data Warehouse Security," 20th National Information Systems Security Conference, Oct. 7-10, 1997—Baltimore, Maryland.

* cited by examiner

US 10,853,502 B1

SYSTEMS AND METHODS FOR REDUCING COMPUTATIONAL DIFFICULTY OF CRYPTOGRAPHIC OPERATIONS

This application claims the benefit of and claims priority to Provisional Patent Application No. 62/128,355, filed on Mar. 4, 2015, which is hereby incorporated by reference herein in its entirety.

BACKGROUND OF THE INVENTION

This invention relates to cryptography and more particularly, to reducing the computational difficulty of performing format-preserving cryptographic operations.

Cryptographic systems are used to secure data in a variety of contexts. For example, encryption algorithms are used to encrypt sensitive information such as financial account numbers, social security numbers, and other personal information. By encrypting sensitive data prior to transmission over a communications network, the sensitive data is secured, even if it passes over an unsecured communications channel. Sensitive data is also sometimes encrypted prior to storage in a database. This helps to prevent unauthorized access to the sensitive data by an intruder.

In some scenarios, a block-cipher-based cryptographic algorithm is used to encrypt or decrypt sensitive data. Such an algorithm involves splitting a data string into first and second portions, performing a pseudo-random algorithm on the second portion to generate a pseudo-random output, and combining the pseudo-random output with the first portion of the data string using a format preserving combining operation. The first portion of the string and the pseudo-random output often have different domain sizes (i.e., a different number of total possible values). However, the format preserving combining operation typically requires that the domain size of the first string portion is similar to the domain size of the pseudo-random output.

In order to perform the format preserving combining operation, the pseudo-random output is scaled to match the domain size of the first string portion using modulo operations. However, for sufficiently large data strings such as those encountered in real world scenarios, the modulo operation will exceed the computational capabilities of the system performing the modulo operation and will generate undesired data overflows that prevent generation of the proper cryptographic output. In some scenarios, these overflows can be mitigated by representing the data strings using a sufficiently encompassing data type or data library such as a so-called BIGNUM data library. However, in practice, performing cryptographic operations using the BIGNUM library requires excessive time and processing resources for the cryptographic system.

It would therefore be desirable to be able to provide cryptographic tools that are capable of encrypting and decrypting large data strings without generating data overflows.

SUMMARY OF THE INVENTION

In accordance with the present invention, a data processing system is provided in which a format-preserving cryptographic function may be used for format-preserving encryption operations and format-preserving decryption operations. Computing equipment in the data processing system may include a cryptographic engine and may be configured to mitigate potential data overflows that arise when performing format-preserving cryptographic operations.

The computing equipment may receive a string (e.g., a plaintext or ciphertext string) and may partition the string into first and second portions. The computing equipment may combine the first portion of the string with the second portion of the string after the second portion of the string has been passed through a pseudorandom function using a format-preserving combination operation that requires inputs having a similar domain size. The computing equipment may include a data size adjustment engine that adjusts the domain size of the output of the pseudorandom function to be similar to (e.g., approximately equal to or equal to) the domain size of the first string. In order to mitigate undesirable data overflows associated with performing size adjustment operations on the output of the pseudorandom function, the output of the pseudorandom function may be partitioned into a number of computationally simpler terms each having a modulo factor and a pre-computed constant value. The computing equipment may pre-compute the constant values in advance, thereby reducing the computational complexity required for performing the size adjustment operations without generating undesirable data overflows.

In an embodiment of the present invention, a method of mitigating data overflows while performing format-preserving cryptographic operations using computing equipment having storage circuitry, a cryptographic engine, and a data size adjustment engine is provided. The computing equipment may pre-compute constant values (e.g., using modulo operations on desired inputs) and may store the pre-computed constant values on the storage circuitry (e.g., volatile memory, nonvolatile memory, etc.). The data size adjustment engine may receive an extracted data string from the cryptographic engine and may partition the extracted data string into multiple string portions.

The data size adjustment engine may retrieve (e.g., read or otherwise receive) the stored set of pre-computed constant values from the storage circuitry and may combine each of the multiple string portions with a respective one of the retrieved pre-computed constant values to generate a size-adjusted output value. The computing equipment may perform a format-preserving combination operation (e.g., a modular addition, etc.) on the size-adjusted output value and an input string (e.g., the first portion of the string in scenarios where a ciphertext or plaintext string is partitioned into first and second portions and the second portion is input to the cryptographic engine) to generate a modified string.

In scenarios where the cryptographic engine performs encryption, the input string may include a plaintext string whereas the modified string includes a ciphertext string. In scenarios where the cryptographic engine performs decryption, the input string may include a ciphertext string whereas the modified string includes a plaintext string.

In accordance with any of the previous embodiments, the computing equipment may partition a given string into the input string and a data string (e.g., the input string may be the first portion of the given string whereas the data string may be the second portion of the given string). The cryptographic engine may perform a pseudorandom operation (function) on the data string using a cryptographic key to generate an output value and the computing equipment may extract a predetermined number of digits (e.g., bits) from the output value to generate the extracted data string. The computing equipment may extract the predetermined number of digits from the output value to generate the extracted data string by identifying a domain size of the input string and identifying the predetermined number of digits to extract from the output value based on the identified domain size of the input string. The computing equipment may identify the predetermined number of digits to extract from the output value by generating a first value by performing a logarithm operation on the identified domain size, generating a first rounded value by rounding the first value to a next highest integer, identifying a constant value, generating a second rounded value by rounding the first rounded value to a next highest integer multiple of the identified constant value, and identifying the predetermined number of digits to extract from the output value by adding the second rounded value to the identified constant value.

In accordance with any of the previous embodiments, the data size adjustment engine may partition the extracted data string into the multiple string portions by partitioning the extracted data string into a first set of string portions and a second set of string portions that is larger than the first set of string portions.

In accordance with any of the previous embodiments, the computing equipment may combine the string portions with the respective pre-computed constant values by partitioning the second set of string portions into multiple modulo terms each multiplied by a respective one of the retrieved pre-computed constant values. The computing equipment may compute each modulo term of the multiple modulo terms, may multiply each of the computed plurality of modulo terms by the respective retrieved pre-computed constant values to generate multiplied values, may sum the multiplied values to generate a summed value, and may add the summed value to the first set of string portions to generate the size-adjusted output value.

In accordance with any of the previous embodiments, the computing equipment may partition the modulus into two or more relatively prime factors, perform the previous pre-computation operations based on the smaller modulus factors instead of the larger whole modulus, generate size-adjusted values based on the modulus factors, and then combine them using the Chinese Remainder Theorem to obtain a size-adjusted output value for the original modulus.

As an example, the computing system may perform cryptographic operations by performing a format-preserving encryption operation on a plaintext string. In an embodiment of the present invention, the computing equipment may include an encryption engine, a data extraction engine, and an output size adjustment engine. The computing equipment may partition an input plaintext string into a first plaintext portion and a second plaintext portion, the first plaintext portion having a given domain size. The output size adjustment engine may generate a size-adjusted output value based on the given domain size (e.g., having the given domain size) by performing size adjustment operations on an extracted value that is generated by the encryption engine and the data extraction engine based on the second plaintext portion. The computing equipment may perform format-preserving combination operations on the size-adjusted output value and the first plaintext portion to generate a ciphertext string (e.g., an intermediate ciphertext string output by a round of a block cipher). The output size adjustment engine may mitigate data overflow while performing the size adjustment operations by partitioning at least some of the extracted value into a linear combination of terms, each term of the linear combination of terms including a modulo factor multiplied by a corresponding pre-computed constant value.

If desired, the encryption engine may generate an output value by encrypting the second plaintext portion using an encryption key, the data extraction engine may identify a predetermined number of digits based on the given domain size, and may generate the extracted value by extracting the predetermined number of digits from the output value.

In accordance with any of the previous embodiments, the computing equipment may perform modulo divide operations to generate the pre-computed constant values and may store the generated pre-computed constant values on storage circuitry at the computing equipment.

In accordance with any of the previous embodiments, the output size adjustment engine may perform the size adjustment operations by computing the modulo factors in each of the terms of the linear combination of terms, multiplying the computed modulo factors in each of the terms of the linear combination of terms by the corresponding pre-computed constant value, summing each of the terms in the linear combination of terms to generate a summed value, and adding the summed value with a portion of the extracted value that is different from the linear combination of terms to generate the size-adjusted output value.

In accordance with any of the previous embodiments, the computing equipment may partition the modulus into two or more relatively prime factors, perform the previous pre-computation operations based on the smaller modulus factors instead of the larger whole modulus, generate size-adjusted values based on the modulus factors, and then combine them using the Chinese Remainder Theorem to obtain a size-adjusted output value for the original modulus.

In accordance with any of the previous embodiments, the plaintext string includes a credit card number.

In accordance with any of the previous embodiments, the first plaintext portion includes a first half of the plaintext string and the second plaintext portion includes a second half of the plaintext string.

As another example, the computing system may perform cryptographic operations by performing a format-preserving decryption operation on ciphertext. In an embodiment of the present invention, the computing equipment may partition an input ciphertext string into a first ciphertext portion and a second ciphertext portion, the first ciphertext portion having a given domain size. The size adjustment engine may generate a size-adjusted output value based on the given domain size (e.g., having the given domain size) by performing size adjustment operations on an extracted value generated by the decryption engine and the data extraction engine based on the second ciphertext portion. The computing equipment may perform format-preserving combination operations on the size-adjusted output value and the first ciphertext portion to generate a plaintext string (e.g., an intermediate plaintext string output by a round of a block cipher). The output size adjustment engine may mitigate data overflow while performing the size adjustment operations by partitioning at least some of the extracted value into a linear combination of terms, where each term of the linear combination of terms includes a modulo factor multiplied by a corresponding pre-computed constant value. The output size adjustment engine may generate the size-adjusted output value by computing the linear combination of terms and adding the computed linear combination of terms to a portion of the extracted value that is different from the linear combination of terms.

If desired, the decryption engine may generate an output value by decrypting the second ciphertext portion using a decryption key, the data extraction engine may identify a predetermined number of bits based on the given domain size and may generate an extracted value by extracting the predetermined number of bits from the output value.

Further features of the invention, its nature and various advantages will be more apparent from the accompanying drawings and the following detailed description of the preferred embodiments.

DETAILED DESCRIPTION OF THE PREFERRED EMBODIMENTS

Figure 1:
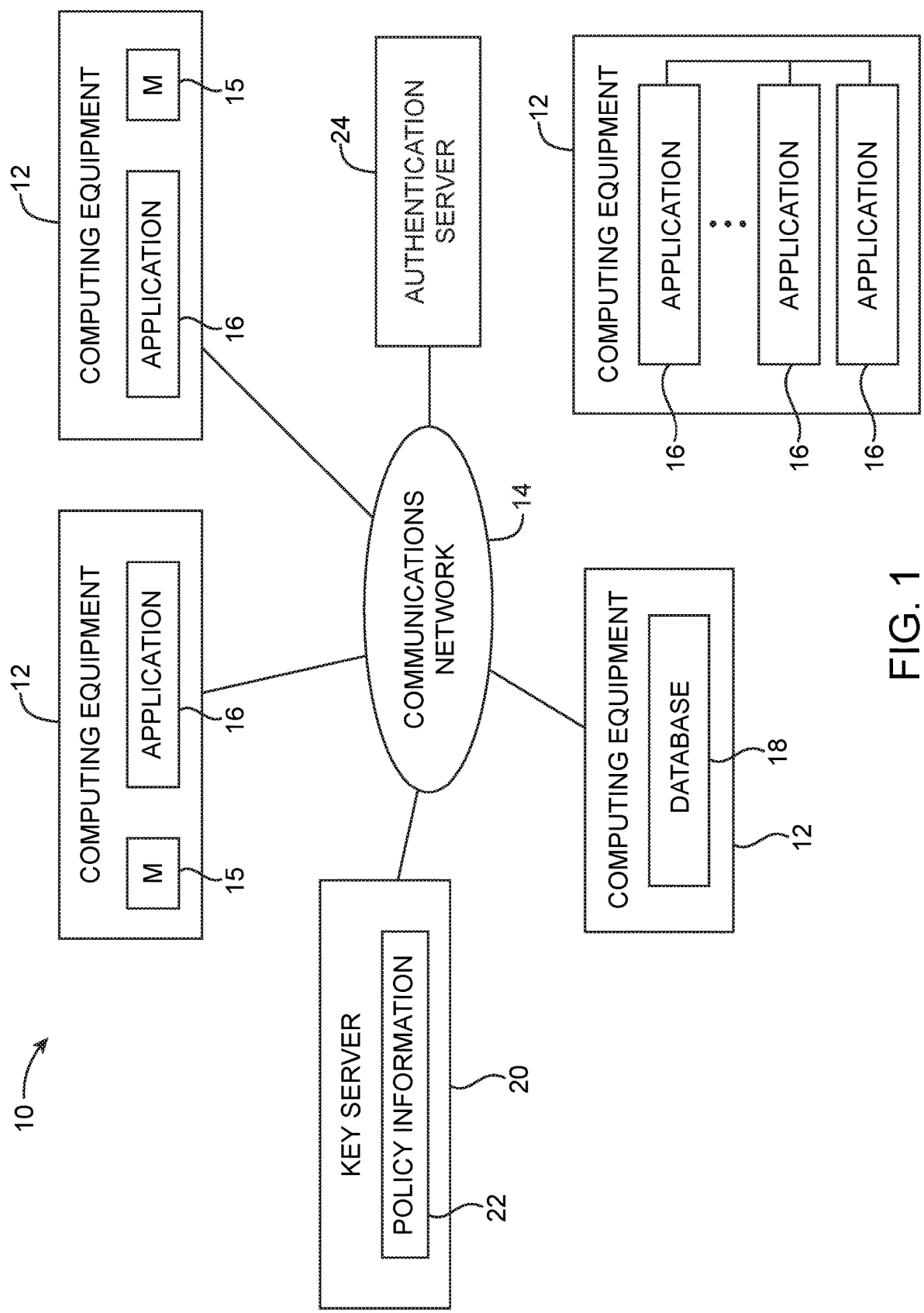
FIG. 1 is a diagram of an illustrative system environment in which cryptographic tools with format-preserving encryption and decryption features may be used in accordance with an embodiment of the present invention.

An illustrative cryptographic system 10 in accordance with an embodiment of the present invention is shown in FIG. 1. System 10 includes computing equipment 12 and communications network 14. The computing equipment 12 may include one or more personal computers, workstations, computers configured as servers, mainframe computers, portable computers, etc. The communications network 14 may be a local area network or a wide area network such as the internet and may include any desired wired or wireless links between network nodes. System 10 may be used in processing data for one or more organizations (e.g., at one or more geographical locations).

Computing equipment 12 may be used to support applications 16 and databases 18. Computing equipment 12 may include storage circuitry such as memory 15. Applications 16 may, for example, be stored on memory 15 and called using processing circuitry such as one or more central processing units (CPUs) on computing equipment 12. In computing equipment 12 in which multiple applications run on the same computer platform, applications and databases may communicate with each other directly. If desired, applications 16 can communicate with each other and with databases 18 remotely using communications network 14. For example, an application 16 that is run on a computer in one country may access a database 18 that is located in another country or an application 16 running on one computer may use network 14 to transmit data to an application 16 that is running on another computer. Applications 16 may be any suitable applications, such as financial services applications, governmental record management applications, cryptographic applications, etc.

The data that is handled by system 10 includes sensitive items such as individuals' addresses, social security numbers and other identification numbers, license plate numbers, passport numbers, financial account numbers such as credit card and bank account numbers, telephone numbers, email addresses, etc. In some contexts, information such as individuals' names may be considered sensitive.

In a typical scenario, a credit card company maintains a database 18 of account holders. The database lists each account holder's name, address, credit card number, and other account information. Representatives of the credit card company may be located in many different geographic locations. The representatives may use various applications 16 to access the database. For example, a sales associate may retrieve telephone numbers of account holders to make sales calls using one application, whereas a customer service representative may retrieve account balance information using another application. Automated applications such as error-checking housekeeping applications may also require access to the database.

To prevent unauthorized access to sensitive data and to comply with data privacy regulations and other restrictions, sensitive data may need to be encrypted. Encryption operations may be performed before data is passed between applications 16 (e.g., on a single computer 12 or on multiple computers) or before data is stored in a database 18. Because various applications may need to access different types of data, the system 10 preferably allows data to be selectively encrypted. As an example, each of the telephone numbers and each of the credit card numbers can be individually encrypted using separate cryptographic keys. With this type of selective encryption arrangement, applications that require access to telephone numbers need not be provided with access to credit card numbers and vice versa.

To support encryption and decryption operations in system 10 applications 16 may be provided with encryption and/or decryption engines. For example, an application 16 that accesses a database 18 over a communications network 14 may have an encryption engine for encrypting sensitive data before it is provided to the database 18 and stored and may have a decryption engine for use in decrypting encrypted data that has been retrieved from database 18 over communications network 14. As another example, a first application may have an encryption engine for encrypting sensitive data before passing the encrypted data to a second application. The second application may have a decryption engine for decrypting the encrypted data that has been received from the first application.

Any suitable technique may be used to provide applications 16 with encryption and decryption capabilities. For example, the encryption and decryption engines may be incorporated into the software code of the applications 16, may be provided as stand-alone applications that are invoked from within a calling application, may be provided as dedicated hardware (e.g., circuitry or other logic hardware) on computing equipment 12, any desired combination of these, or may be implemented using a distributed arrangement in which engine components are distributed across multiple applications and/or locations.

Key server 20 may be used to generate and store cryptographic keys that are used by the encryption and decryption engines. Key server 20 may include policy information 22 that key server 20 uses in determining whether to fulfill key requests. As an example, policy information 22 may include a set of policy rules that dictate that keys should only be released if they have not expired and if the key requester's authentication credentials are valid.

In a typical scenario, an application requests a key from key server 22. When requesting the key, the application provides authentication credentials to the key server 20. The key server 20 provides the authentication credentials to authentication server 24. Authentication server 24 verifies the authentication credentials and provides the results of the verification operation to the key server over communications network 14. If the key requester is successfully authenticated and if the key server determines that the expiration period has not yet expired, the key server can satisfy the key request by providing the requested key to the application over a secure path in network 14 (e.g., over a secure sockets layer link). Other authentication techniques and key request arrangements may be used if desired.

Figure 2:
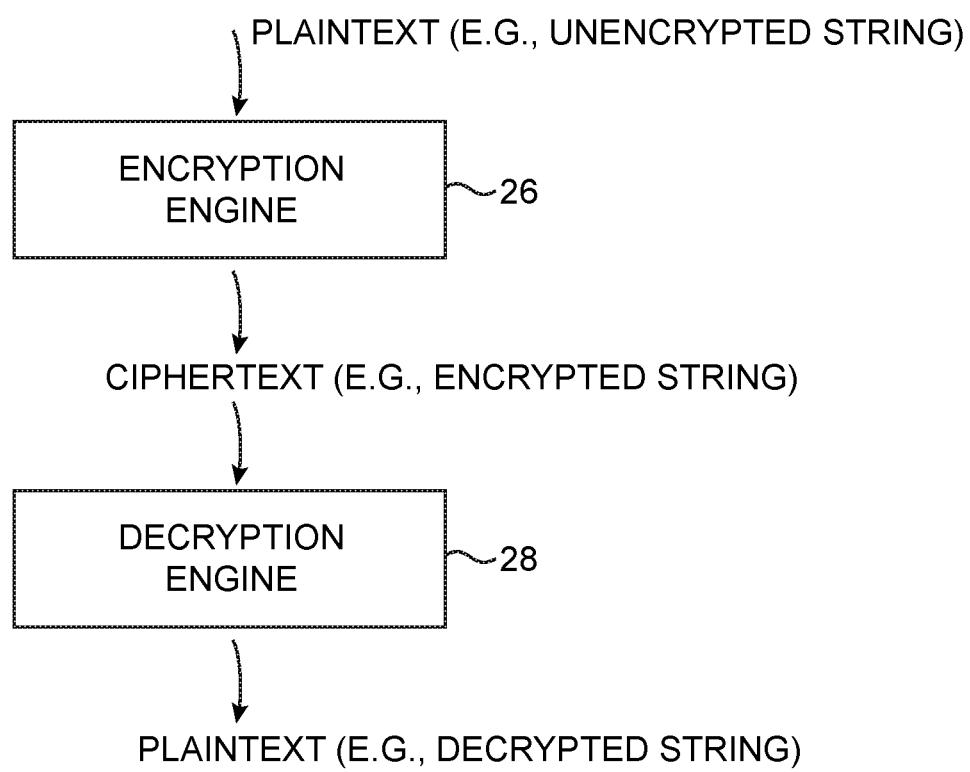
FIG. 2 is a diagram showing how encryption and decryption engines preserve the format of a string in accordance with an embodiment of the present invention.

The data handled by the applications 16 and databases 18 of system 10 is represented digitally. The data includes strings of characters (i.e., names, addresses, account numbers, etc.). As shown in FIG. 2, during encryption operations, an encryption engine 26 encrypts unencrypted strings of characters (sometimes referred to as plaintext) into encrypted strings of characters (sometimes referred to as ciphertext). During decryption operations, a decryption engine 28 decrypts encrypted strings of characters (e.g., ciphertext strings) to form unencrypted strings of characters (e.g., plaintext strings).

The data strings that are handled in a typical data processing system have defined formats. For example, an identification number may be made up of three letters followed by ten digits. The encryption and decryption engines of the present invention are able to encrypt and decrypt strings without changing a string's format (i.e., so that a plaintext identification number made up of three letters followed by ten digits would be encrypted to form corresponding ciphertext made up of three letters and ten digits). The ability to preserve the format of a data string greatly simplifies system operations and allows systems with legacy applications to be provided with cryptographic capabilities that would not be possible using conventional techniques.

Conventional encryption algorithms can alter the format of a string during encryption, so that it becomes difficult or impossible to use the encrypted version of the string. For example, it may be impossible to store a conventionally-encrypted credit card number in a database table that has been designed to handle strings that contain only digits.

In accordance with the present invention, data stings can be encrypted and decrypted while preserving the format of the strings. Consider, as an example, the encryption and decryption of credit card numbers. Credit card numbers generally have between 13 and 18 digits. The format for a particular valid credit card number might require that the credit card number have 16 digits. This type of credit card number will be described as an example.

In a 16-digit credit card number, the digits are typically organized in four groups of four each, separated by three spaces. During a format-preserving encryption operation, an unencrypted credit card number such as "4408 0412 3456 7890" may be transformed into credit-card-formatted ciphertext such as "4417 1234 5678 9114" and during decryption, the ciphertext "4417 1234 5678 9114" may be transformed back into the unencrypted credit card number "4408 0412 3456 7890".

If desired, a so-called Luhn algorithm may be performed to generate a Luhn checksum computed over the entire credit card number. The last digit may be adjusted, if desired, so that the checksum of the entire credit card number is valid. Any single-digit error in the credit card number and most adjacent digit transpositions in the credit card number will alter the checksum value, so that data entry errors can be identified.

During encryption operations, the encryption engine 26 can compute a new checksum value. The new checksum digit can be used in the ciphertext or, if desired, policy information such as a validity period may be embedded within the checksum digit by adding an appropriate validity period index value to the new checksum value. When a validity period is embedded within a checksum digit, the resulting modified checksum value will generally no longer represent a valid checksum for the string. However, applications in system 10 will be able to retrieve the validity period information from the checksum digit and will be able to use the extracted validity period information in obtaining a decryption key from key server 20 (FIG. 1).

This type of embedding operation may be used to store any suitable information within encrypted data. The use of credit card numbers, and, more particularly, the use of validity period information that has been embedded within the checksum digits of credit card numbers are described herein as examples.

Because encryption and decryption engines 26 and 28 of FIG. 2 can preserve a desired format for a string during encryption and decryption operations, sensitive data can be secured without requiring entire files to be encrypted, for example.

The encryption and decryption engines 26 and 28 preferably use index mappings to relate possible character values in a given string position to corresponding index values in an index. By mapping string characters to and from a corresponding index, the encryption and decryption engines 26 and 28 are able to perform encryption and decryption while preserving string formatting.

In a typical scenario, an index mapping may be formed using a table having two columns and a number of rows. The first column of the mapping corresponds to the potential character values in a given string position (i.e., the range of legal values for characters in that position). The second column of the mapping corresponds to an associated index. Each row in the mapping defines an association between a character value and a corresponding index value.

Consider, as an example, a situation in which the string being encrypted has first, fifth, sixth, and seventh string characters that are digits and second, third, and fourth characters that are uppercase letters. In this situation, the possible character values in the first, fifth, sixth, and seventh character positions within the plaintext version of the string might range from 0 to 9 (i.e., the first character in the string may be any digit from 0 through 9, the fifth character in the string may be any digit from 0 to 9, etc.). The possible character values in the second, third, and fourth positions in the string range from A to Z (i.e., the second character in the unencrypted version of the string may be any uppercase letter in the alphabet from A to Z, the third character in the unencrypted version of the string may be any uppercase letter from A through Z, etc.).

The index mapping in this type of situation may map the ten possible digit values for the first, fifth, sixth, and seventh string characters into ten corresponding index values (0 . . . 9). For the second, third, and fourth character positions, 26 possible uppercase letter values (A . . . Z) may be mapped to 26 corresponding index values (0 . . . 25).

In a typical string, not all characters have the same range of potential character values. If there are two ranges of potential character values, two index mappings may be used, each of which maps a different set of possible character values to a different set of index values. If there are three ranges of potential character values within the string, three index mappings may be used. For example, a first index mapping may relate a digit character to a first index, a second index mapping may relate an uppercase letter character to a second index, and a third index mapping may relate an alphanumeric character to a third index. In strings that contain a larger number of different character types, more index mappings may be used.

In general, a string contains a number of characters N. The potential character values in the string are related to corresponding index values using index mappings. An index mapping is created for each character. The indexes used to represent each character may have any suitable size. For example, an index containing 52 index values may be associated with string characters with character values that span both the uppercase and lowercase letters. Because not all of the characters typically have the same range of potential character values, there are generally at least two different index mappings used to map character values in the string to corresponding index values. In a string with N characters, N index mappings are used, up to N of which may be different index mappings.

Any suitable cryptographic formulation may be used for the format-preserving encryption and decryption engines 26 and 28, provided that the cryptographic strength of the encryption algorithm is sufficiently strong. With one suitable approach, encryption engine 26 and decryption engine 28 use a cryptographic algorithm based on the well-known Luby-Rackoff construction. The Luby-Rackoff construction is a method of using pseudo-random functions to produce a pseudo-random permutation (also sometimes referred to as a block cipher). A diagram showing how encryption engine 26 and decryption engine 28 may be implemented using the Luby-Rackoff construction is shown in FIG. 3.

During encryption operations, an unencrypted (plaintext) string is divided into two portions. The unencrypted string may be divided into two portions using any suitable scheme. For example, the string may be divided into odd and even portions by selecting alternating characters from the string for the odd portion and for the even portion. With another suitable approach, the unencrypted string is divided into two portions by splitting the string into left and right halves or left and half portions of any desired size that include the most and least significant digits of the plaintext string, respectively.

Figure 3:
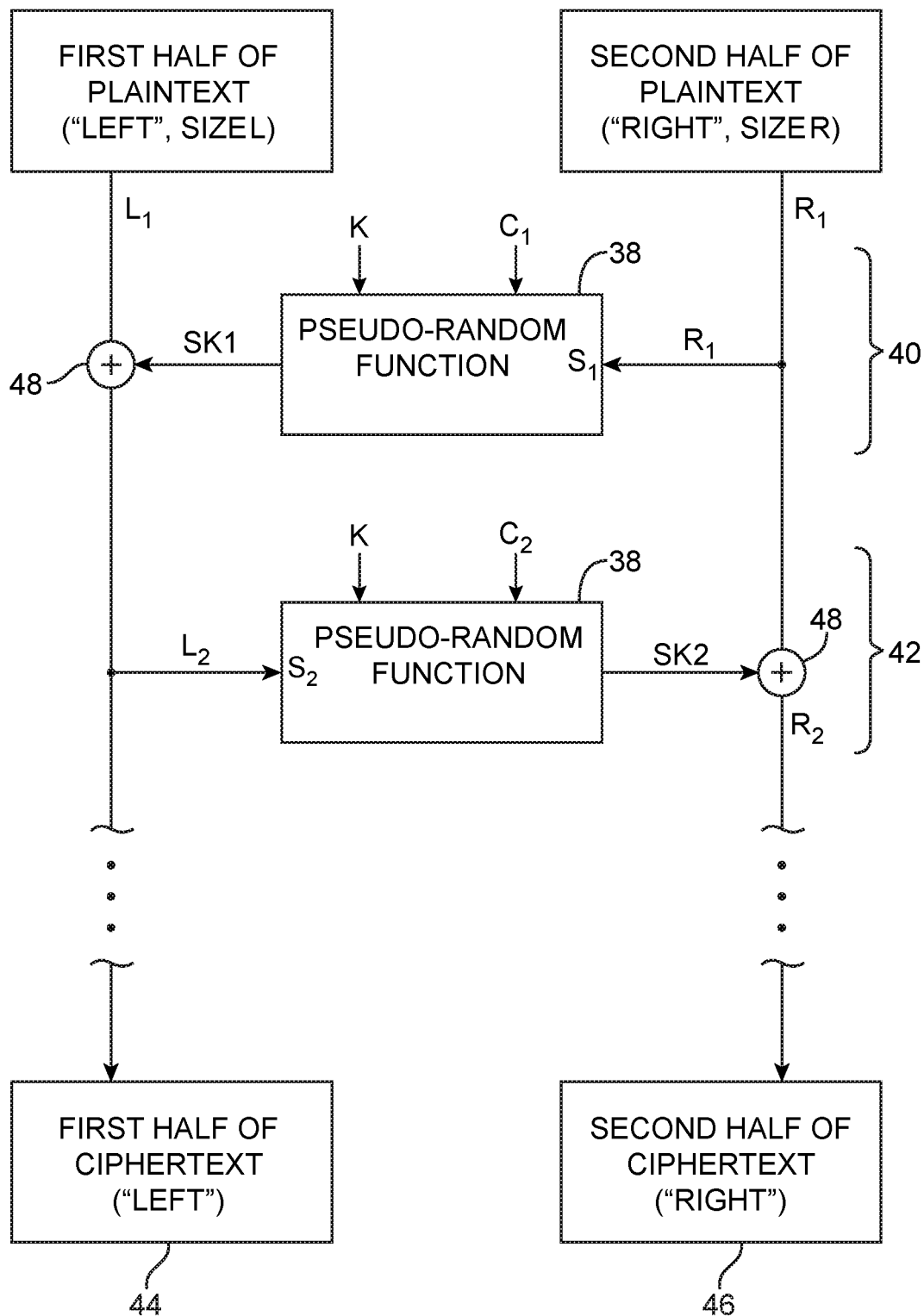
FIG. 3 is a diagram of an illustrative format-preserving block cipher that may be used during data encryption and decryption in accordance with an embodiment of the present invention.

In FIG. 3, the first portion of the unencrypted string is labeled "$L_1$" and the second portion of the unencrypted string is labeled "$R_1$". During encryption operations with encryption engine 26, the unencrypted string portions $L_1$ and $R_1$ are processed to form corresponding encrypted string portions 44 and 46. During decryption operations with decryption engine 28, processing flows from the bottom of FIG. 3 towards the top, so that encrypted string portions 44 and 46 are decrypted to produce unencrypted portions $L_1$ and $R_1$. Processing occurs in multiple rounds (e.g., first round 40 and second round 42 are shown in FIG. 3 but in general any desired number of rounds may be performed). During encryption, the operations of round 40 are performed first, the operations of round 42 are performed second, and the operations of additional rounds (not shown) are performed subsequent to the second round 42. During decryption, the operations of rounds between round 42 and ciphertext 44/46 are performed first, the operations of round 42 are performed second, and the operations of round 40 are performed third. Although shown as involving two rounds in the example of FIG. 3, the operations of FIG. 3 may, if desired, be implemented using three or more rounds.

The block cipher structure of FIG. 3 encrypts (or decrypts) a string of a particular known size to produce an output string of the same size. The block cipher uses a pseudo-random function 38 (e.g., a subkey generation algorithm or any other desired encryption algorithm). The pseudo-random algorithm 38 has three inputs: a key K, a constant C ($C_1$ for round 40, $C_2$ for round 42, etc.), and a string S ($S_1=R_1$ for round 40, $S_2=L_2$ for round 42, etc.).

The subkey generation algorithm 38 may, for example, include a function H' that is based on a cryptographic hash function H and that takes as an input S, C, and K. With one suitable approach, the subkey generation algorithm H' is given by equation 1.

$$H'=H(S|C|K) \tag{1}$$

In equation 1, the symbol "|" represents the concatenation function. The cryptographic hash function H is preferably chosen so that the subkey generation algorithm has a suitable cryptographic strength. Illustrative cryptographic hash functions that can be used for hash function H include the SHA1 hash function, the SHA2 hash function, and the AES algorithm used as a hash function.

The value of the key K may be the same for rounds 40, 42, and 44. The value of the constant C is different for each round, for example. With one suitable arrangement, the constant $C_1$ that is used in round 40 is equal to 1, the constant $C_2$ that is used in round 42 is 2, etc. The value of S varies in each round. In round 40, $S_1$ is equal to the first half of the unencrypted string $R_1$. In round 42, $S_2$ is equal to $L_2$.

In first round 40, the output of the pseudo-random function 38 is output value SK1 (sometimes referred to herein as subkey SK1). Output value SK1 may be computed, for example, based on SK1=$H(S_1|C_1|K)$. In round 42, the output of the subkey generation algorithm is output value SK2 (sometimes referred to herein as subkey SK2). Output value SK2 may be, for example, based on SK2=$H(S_2|C_2|K)$.

Pseudo-random function 38 may involve the use of a cryptographic hash function for the pseudo-random function. If desired, the pseudo-random function may be implemented using a cryptographic message authentication code (MAC) function. A cryptographic message authentication code function is a keyed hash function. Using a cryptographic message authentication code function, SK1 may be given based on SK1=MACF(S|C|K), where MACF is the message authentication code function. An example of a message authentication code function is CMAC (cipher-based MAC), which is a block-cipher-based message authentication code function. The cryptographic message authentication code function AES-CMAC is a CMAC function based on the 128-bit advanced encryption standard (AES). In these scenarios, which are described herein as an example, pseudo-random function 38 outputs a 128-bit value.

A format-preserving combining operation (labeled "+" in FIG. 3) is used to combine the outputs SK1, SK2, etc. with respective string portions. During encryption operations, format-preserving combining operation 48 combines output SK1 with string $L_1$ to produce string $L_2$. During decryption operations, format-preserving combining operation 46 combines SK1 with string $L_2$ to produce string $L_1$. Format-preserving combining operation 48 combines SK2 with string $R_1$ to produce string $R_2$ during encryption operations and combines SK2 with string $R_2$ to produce string $R_1$ during decryption operations.

The format-preserving combining operation "+" preserves the format of the strings $L_1$, $L_2$, $R_1$, and $R_2$ as they are combined with the outputs SK1 and SK2. For example, the string $L_2$ that is produced by combining string $L_1$ and subkey SK1 has the same format as the string $L_1$.

The format-preserving combining operation "+" may be based on any suitable mathematical combining operation. For example, the function "+" may be an addition mod x function or the function "+" may be multiplication mod x function, where x is an integer of an appropriate size (i.e., $x=y^z$, where z is equal to the length of the string S, and where y is equal to the number of possible character values for each character in the string S). If, as an example, the string S contains 16 digits (each digit having one of 10 possible values from 0 to 9), x would be $10^{16}$. If the string S contains three uppercase letters (each uppercase letter having one of 26 possible values from A to Z), x would be $26^3$. These are merely illustrative examples. The format-preserving combining function "+" may be any reversible logical or arithmetic operation that preserves the format of its string input when combined with the subkey.

In practice, format preserving combination operations 48 require inputs having a common domain size to function properly. The domain size of a string may be defined as the number of possible values of that string. For example, if string $L_1$ is a string of five digits (e.g., a string of length 5) each ranging from 0 to 9 (e.g., $L_1$="12345," "67890," "09876," etc.) the domain size of $L_1$ would be $10^5$ (e.g., because ten possible values for each of five digits gives a total number of possible values for the string of $10*10*10*10*10=10^5$). In this scenario, combination operation 48 would require key SK1 to also be a five digit string of digits ranging from 0 to 10.

However, in many scenarios, encryption/decryption engines used in performing pseudo-random algorithm 38 outputs values that do not have the same domain size as the string with which the output values are to be combined. For example, in scenarios where 128-bit advanced encryption standard (AES) encryption is performed during pseudo-random algorithm 38, the 128-bit output of the function (e.g., 128 digits in base 2 or approximately 39 digits in base 10) will only be combinable using operation 48 for strings $L_1$ having the same domain size. In order to generate output SK1 for combining circuit 48 having the appropriate domain size (e.g., a domain size matching that of the string to be combined), function 38 may include subkey size adjustment (scaling) circuitry that adjusts the domain size of the output of the encryption/decryption engine in pseudo-random function 38 to a desired domain size.

Figure 4:
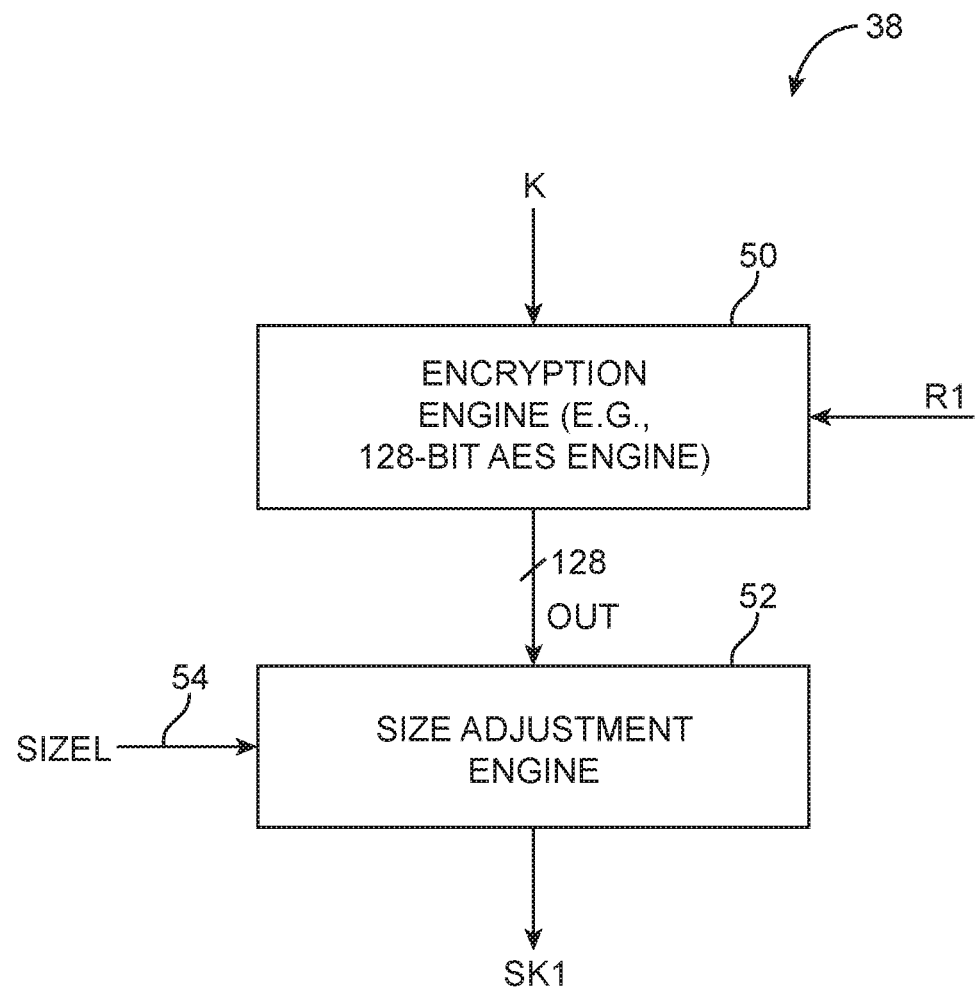
FIG. 4 is a diagram of illustrative encryption and data scaling circuitry that may be used in a format-preserving block cipher of the type shown in FIG. 3 for performing encryption and decryption in accordance with an embodiment of the present invention.

FIG. 4 is an illustrative diagram showing how pseudo-random engine 38 may include an encryption engine and a size adjustment (scaling) engine for generating subkey SK1 having a domain size that matches the domain size of the string with which it is to be combined using format preserving operation 48.

As shown in FIG. 4, function engine 38 may include an encryption engine 50 that receives a string (e.g., plaintext string portion R1) and cryptographic key K (e.g., engine 38 as shown in FIG. 4 may correspond to first round 40 of FIG. 3). Engine 50 may, for example, be a 128-bit AES encryption engine that encrypts string R1 using key k to output a 128-bit encrypted value OUT (e.g., a 128 digit output value in base 2 or approximately 39 digit output value in base 10). Encrypted value OUT may be provided to data size adjustment engine 52.

Size adjustment engine 52 may receive a control signal via input 54 that identifies a domain size SIZEL of string $L_1$. For example, if string $L_1$ is a five digit string, the control signal received at input 54 may identify that the domain size of string $L_1$ is SIZEL=$10^5$, which is significantly less than the domain size of the approximately 39 digit value OUT in base 10 (~$10^{39}$). Size adjustment engine 52 may adjust the domain size of encrypted value OUT based on the identified size SIZEL of string $L_1$ to generate subkey output SK1 having a similar domain size as string $L_1$ (e.g., so that output SK1 can be combined with string $L_1$ using format preserving operation 48).

The example of FIG. 4 in which pseudo-random function 38 of first round 40 is shown is merely illustrative. Similar circuitry may be included in pseudo-random engine 38 for each round. For example, in second round 42, encryption engine 50 may receive string $L_2$ and key K as inputs, output size adjustment engine 52 may receive a control signal identifying the size of string $R_1$ and may output subkey SK2 having a size that matches the size of string $R_1$. The direction of signal flow as shown in FIG. 4 may be reversed when performing decryption operations (e.g., encryption engine 50 may be replaced by a corresponding decryption engine). In general, domain size SIZEL may be any desired value and the output OUT of engine 50 may be any desired size.

Figure 5:
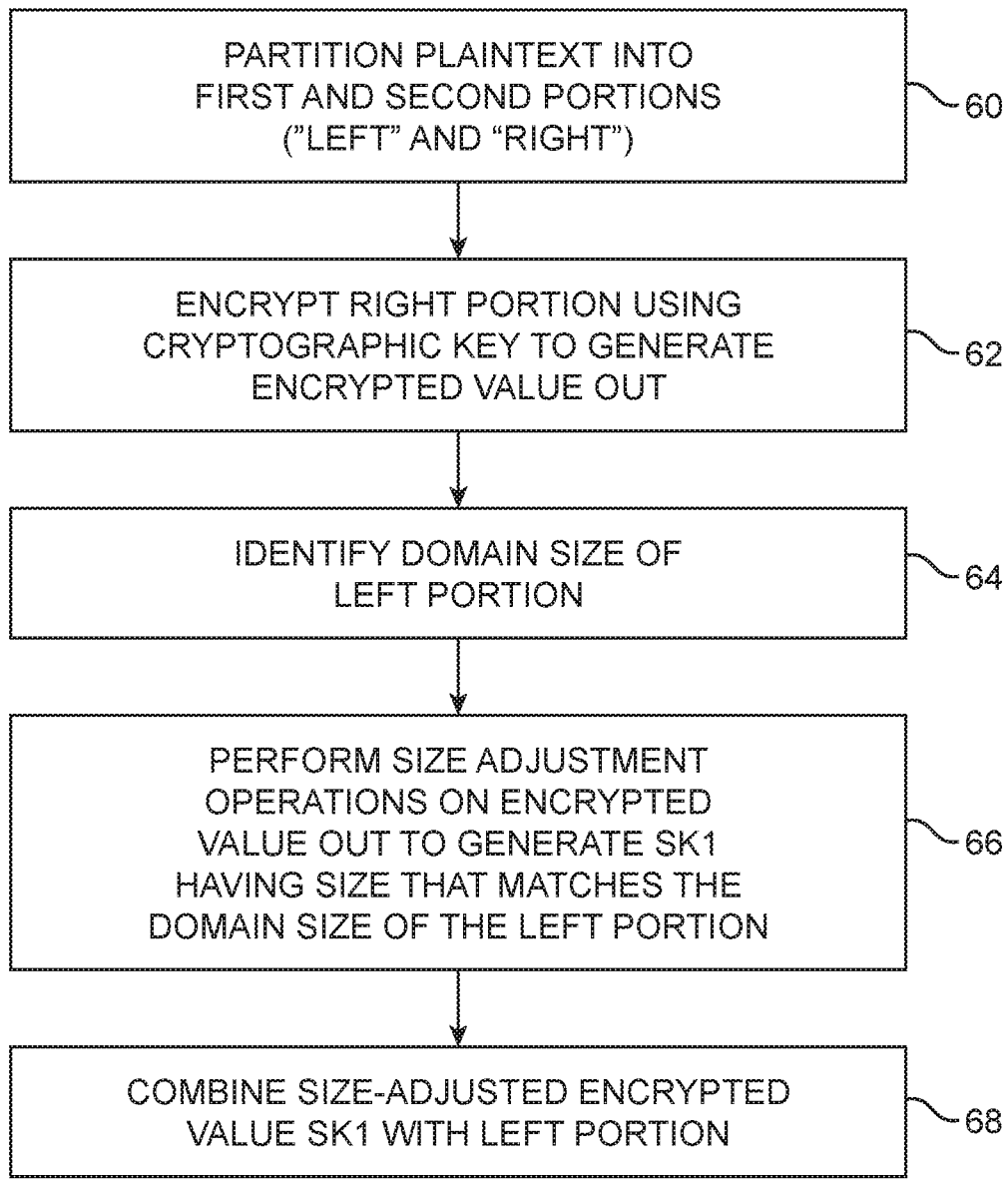
FIG. 5 is a flow chart of illustrative steps that may be used by a cryptographic engine of the type shown in FIGS. 2 and 3 to perform a round of a format-preserving block cipher in accordance with an embodiment of the present invention.

FIG. 5 is a flow chart of illustrative steps that may be used by encryption engine 26 and combining function 48 to perform a first round of a cryptographic algorithm of the type shown in FIG. 4. The steps of FIG. 5 may, for example, be performed after a plaintext string is identified (e.g., a credit card number, social security number, or any other desired sensitive information).

At step 60, encryption engine 26 may partition the identified plaintext into first ("left") and second ("right") portions. The first and second portions may be of equal size or may be of different sizes. As one example, the plaintext may be the string "12343123456789067890" and encryption engine 26 may partition the string into a left portion $L_1$="1234512345" and a right portion $R_1$="6789067890."

At step 62, encryption engine 50 may encrypt the right portion $R_1$ of the string using a corresponding cryptographic key K to generate encrypted output value OUT. For example, engine 50 may perform 128-bit AES encryption (as shown in the example of FIG. 4) or any other desired block cipher algorithm to generate an output of any desired length and domain size. The encrypted value OUT may be provided to size adjustment (scaling) engine 52.

At step 64, encryption engine 26 may identify a domain size of left portion $L_1$. In the scenario where portion $L_1$="1234512345," the domain size of portion $L_1$ is SIZEL=$10^{10}$, because string $L_1$ has 10 digits each ranging from 0 to 9. The identified domain size may be identified by control signals received by size adjustment engine 52 via path 54 (FIG. 4).

At step 66, size adjustment engine 52 may perform size adjustment (scaling) operations on encrypted value OUT based on the identified domain size of left string $L_1$ to generate size adjusted output SK1 having a similar domain size as string $L_1$ (e.g., so that SK1 may be combined with string $L_1$ using operation 48). Size adjustment engine 52 may perform scaling operations by, for example, performing a modulo operation (sometimes referred to herein as a modular division, a modulus division, modulus divide, or modulo divide operation) on some or all of encrypted value OUT by the identified domain size of left string $L_1$ to generate scaled value SK1.

At step 68, operation 48 may be performed to combine scaled value SK1 with left string portion $L_1$ to generate string $L_2$ (FIG. 3). The example of FIG. 5 in which the first round 40 as shown in FIG. 3 is performed is merely illustrative. In general, the procedure of FIG. 5 may be performed at any desired round in encryption or decryption operations of FIG. 3. For example, when performing second round 42, step 62 may encrypt the left string $L_2$, step 64 may identify the domain size of right string $R_1$, etc. Similar steps may be performed in a reverse direction to decrypt ciphertext strings.

For relatively large domain sizes, size adjustment engine 52 may encounter difficulty in computing the modulo operations required to generate scaled value SK1 (e.g., at step 66) due to a potential data overflow when performing arithmetic operations on excessively large numbers. For example, in scenarios where size adjustment engine 52 is implemented on 64-bit computing equipment, domain sizes of greater than or equal to about $10^{10}$ can exceed the computational capabilities of the 64-bit computing equipment and may result in undesirable data overflows. In some scenarios, these overflows can be mitigated by representing the strings using a sufficiently encompassing data type or data library such as a BIGNUM data library. However, in practice, performing operations using the BIGNUM library may require excessive time and processing resources. It may therefore be desirable to be able to perform the required scaling operations without using a BIGNUM library.

Figure 6:
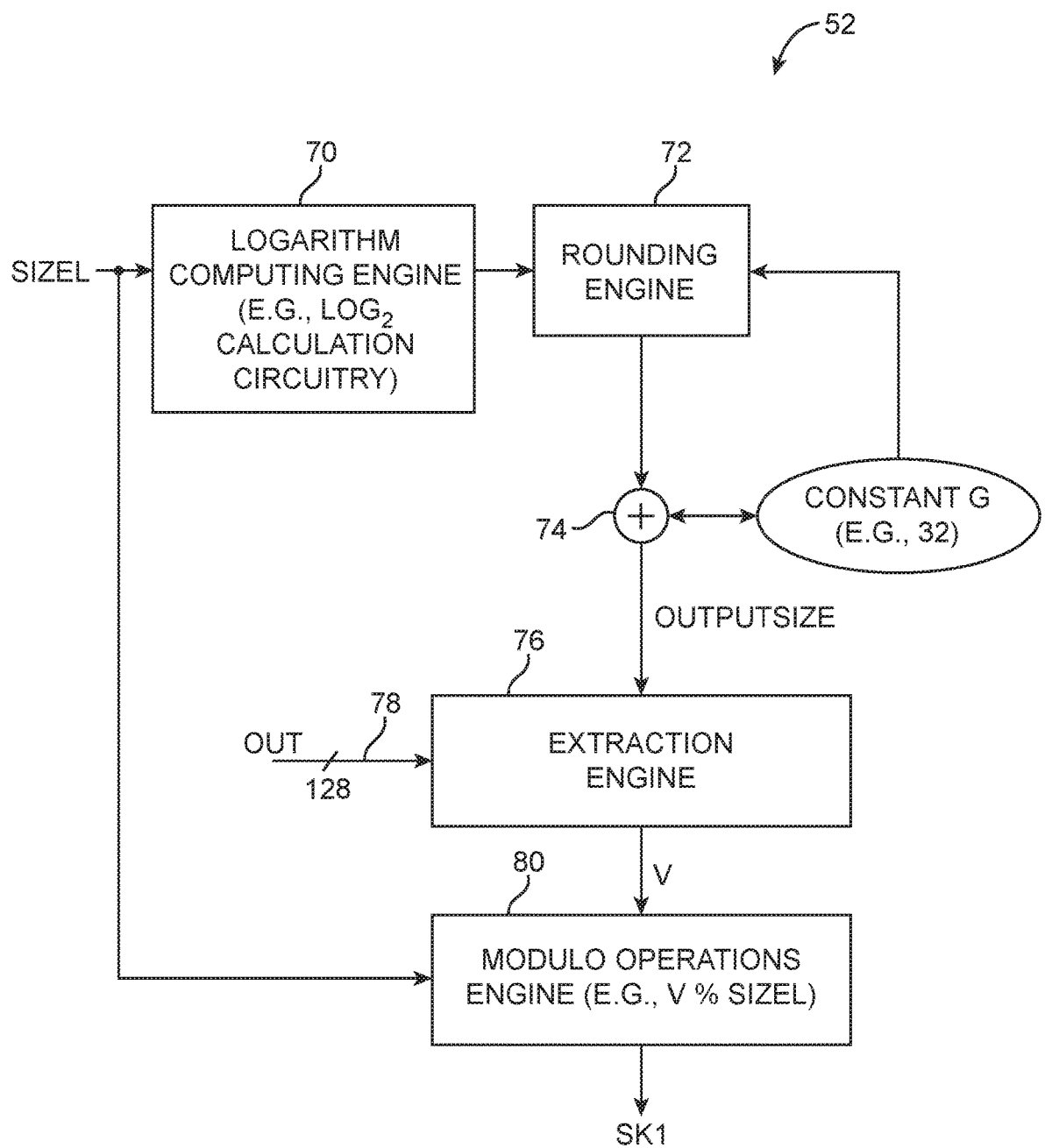
FIG. 6 is a diagram of illustrative scaling circuitry of the type shown in FIG. 4 that reduces the size of the output of a cryptographic engine so that the output may be combined with a string having a predetermined size using a format preserving combining operation in accordance with an embodiment of the present invention.

FIG. 6 is an illustrative diagram that shows how size adjustment engine 52 may perform scaling operations on encrypted value OUT based on the identified domain size SIZEL of left string $L_1$ to generate a scaled value SK1 having a similar domain size to left string $L_1$. As shown in FIG. 6, size adjustment engine 52 may include a logarithm computing engine 70, a rounding engine 72, adder circuitry 74, a data extraction engine 76, and a modular arithmetic engine 80.

Logarithm computing engine 70 may receive control signals identifying domain size SIZEL of left string $L_1$ (e.g., identifying domain size $10^{10}$ of string $L_1$). Logarithm computing engine 70 may compute a logarithm of the identified domain size SIZEL of string $L_1$. In one suitable arrangement, engine 70 performs a base-2 logarithm of the identified domain size. In general, any desired base may be used. For example, logarithm engine 70 may compute $LOG_2$ $(10^{10})\approx 33.219$ and may output this value to rounding engine 72.

If desired, rounding engine 72 may round the received logarithm value to the next highest integer. For example, engine 70 may round $LOG_2$ $(10^{10})\approx 33.219$ to 34. Rounding engine 72 may receive a constant value G (e.g., from memory, control circuitry, or any other desired circuitry) and may round the rounded logarithm received from engine 70 to the next highest integer multiple of constant G to generate a corresponding rounded value. In one suitable arrangement, constant value G is equal to 32. In this example, rounding engine 72 may round the value 34 up to 64, which is the next highest integer multiple of 32 that is greater than 34 (e.g., 64=2*32). Engine 72 may output the rounded value to adder circuitry 74. In general, any desired constant value G may be used.

Adder circuitry 74 may add the received rounded value to constant G to generate an added value OUTPUTSIZE. For example, rounding circuitry 74 may add rounded value 64 to the constant G=32 to generate an added value OUTPUTSIZE=96 (96=64+32). Added value OUTPUTSIZE may be provided to data extraction engine 76.

Data extraction engine 76 may receive encrypted value OUT (e.g., a 128-bit value or any other desired value) from encryption engine 50 via input 78. Extraction engine 76 may extract a predetermined number of digits from encrypted value OUT based on the received added value OUTPUTSIZE to generate extracted data V. For example, engine 76 may extract a number of most significant digits from encrypted value OUT that is equal to the added value OUTPUTSIZE. In the scenario where OUTPUTSIZE is equal to 96, extraction engine 76 may generate extracted data V as the first 96 (e.g., most significant 96) digits from encrypted value OUT. Extraction engine 76 may provide extracted data V to modulo engine 80.

Modulo engine 80 may receive extracted data V from extraction engine 76 and the control signals identifying domain size SIZEL of left string $L_1$. Modular operations engine 80 may generate scaled output value SK1 by scaling extracted data V to the desired domain size associated with left string $L_1$ by performing a modulo operation on the extracted value V by the identified domain size SIZEL of left string $L_1$. For example, engine 80 may generate output value SK1 by computing SK1=V % SIZEL, where SIZEL is the identified domain size of left string $L_1$ and "%" is the modulo operator (e.g., where operator "%" is defined such that A % B is equal to the remainder of the Euclidean division operation of A by B). In the scenario where value V is equal to the first 96 digits of encrypted value OUT and SIZEL=$10^{10}$, engine 80 may generate SK1 by computing SK1=V % $10^{10}$. However, the computation of modulo factor V % $10^{10}$ may exceed the computational capabilities of common 64-bit computing systems on which engine 80 is located (e.g., if care is not taken, data overflows will occur when performing the modulo operation).

Figure 7:
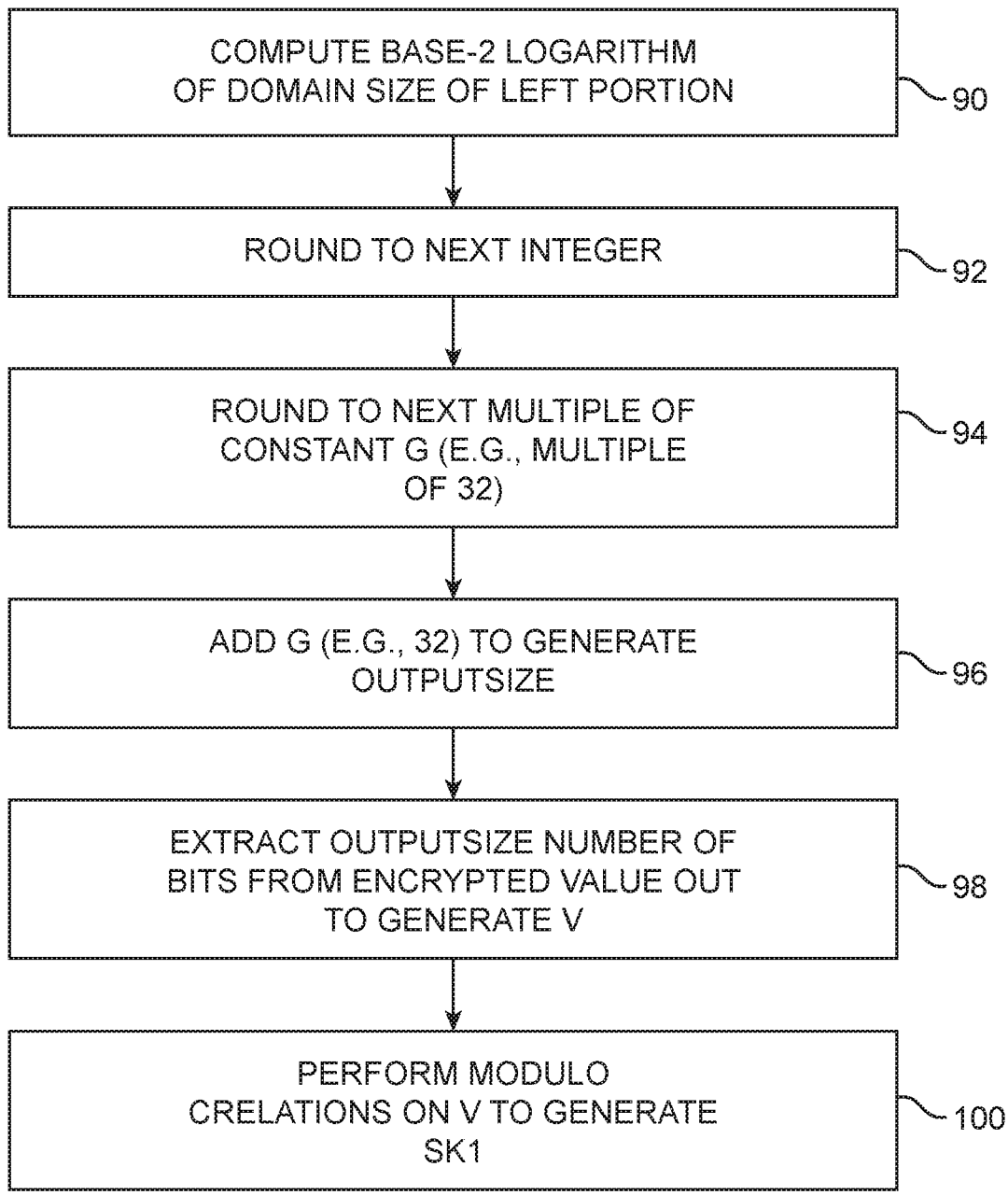
FIG. 7 is a flow chart of illustrative steps that may be performed by scaling circuitry of the type shown in FIG. 6 for adjusting the size of the output of a cryptographic engine so that the output may be combined with a string having a predetermined size using a format preserving combining operation in accordance with an embodiment of the present invention.

FIG. 7 is a flow chart of illustrative steps that may be performed by size adjustment engine 52 for generating scaled value SK1. The steps of FIG. 7 may, for example, be performed while processing step 66 of FIG. 5.

At step 90, logarithm computing engine 70 may compute a base two logarithm of the identified domain size of left string $L_1$ to generate a corresponding logarithm value. For example, engine 70 may compute a value $LOG_2$ $(10^{10})\approx 33.219$ and may output this value to rounding engine 72.

At step 92, rounding engine 72 may round the received logarithm value to the next highest integer. For example, engine 70 may round 33.219 up to 34.

At step 94, rounding engine 74 may round the logarithm value that was rounded to the next highest integer to the next integer multiple of constant value G. For example, when G is equal to 32, rounding engine 70 may round 34 up to 64.

At step 96, adder circuitry 74 may add constant value G to the rounded value generated at step 94 to generate added value OUTPUTSIZE. For example, adder circuitry 74 may add a constant value of 32 to a rounded value of 64 to generate an OUTPUTSIZE value of 96.

At step 98, extraction engine 76 may generate value V by extracting a selected number of most significant digits from encrypted value 78 that is equal to added value OUTPUTSIZE generated by adder 74. For example, extraction engine 76 may generate value V as the first 96 values of encrypted value OUT.

At step 100, modulo operations engine 80 may perform a modulo operation on extracted value V by the identified domain size SIZEL of left string $L_1$ to generate scaled value SK1. For example, modular operations engine 80 may generate scaled value SK1=V % SIZEL. In scenarios where V and/or SIZEL are sufficiently large (e.g., greater than or equal to approximately $10^{10}$), if care is not taken, the modulo operations performed by engine 80 may exceed the capabilities of a 64-bit system on which the engine is implemented (e.g., naively performing a single modulo operation of V by SIZEL may generate a data overflow and may not produce a viable output given the computational constraints associated with encryption engine 26).

Figure 8:
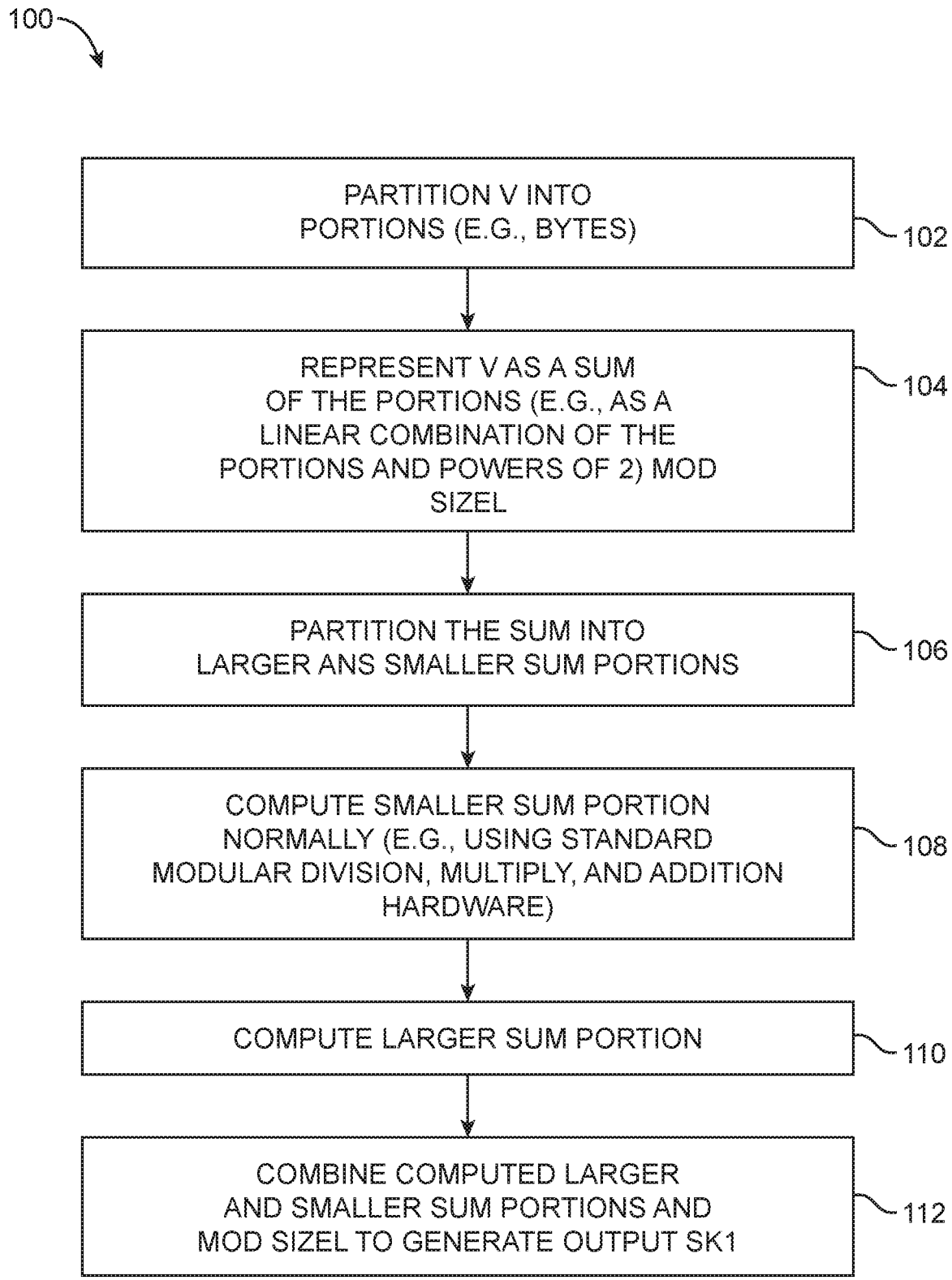
FIGS. 8 and 9 are flow charts of illustrative steps that may be performed by scaling circuitry to reduce the computational complexity of a modulo operation by adjusting the size of the output of a cryptographic engine so that the output may be combined with a string having a predetermined size in accordance with an embodiment of the present invention.

FIG. 8 is a flow chart of illustrative steps that may be performed by modulo operations engine 80 to generate scaled value SK1 in scenarios where domain size SIZEL and/or value V are excessively large (e.g., in scenarios where SIZEL and/or value V would generate a data overflow when performing the modulo operation). The steps of FIG. 8 may, for example, be performed without generating data overflows on a 64-bit computing system (or any other computing system having limited processing capabilities) and without resorting to a time consuming and inefficient data libraries for encompassing large numbers such as the BIGNUM library. The steps of FIG. 8 may, for example, be performed while processing step 100 of FIG. 7.

At step 102, engine 80 may partition extracted value V into a number of portions (e.g., multiple equally sized portions or portions of different sizes). As one example, engine 80 may partition value V into multiple 8-bit bytes. In the example where value V is the first 96 digits of encrypted value OUT, engine 80 may partition value V into 12 equally sized portions (bytes). For example, engine 80 may partition value V into portions $V_i$ where i is an integer from 0 to one fewer than the total number of portions, such that V once partitioned can be represented as $V=V_{11}|V_{10}|V_9|V_8|V_7|V_6|V_5|V_4|V_3|V_2|V_1|V_0$ (e.g., with $V_{11}$ being the most significant portion including the most significant digits and $V_0$ being the least significant portion including the least significant digits of extracted value V).

At step 104, engine 80 may represent value V as a linear combination of the portions identified at step 102 and corresponding powers of 2, modulo the identified domain size SIZEL of string $L_1$ (e.g., engine 80 may generate a linear combination of the portions identified at step 102 and corresponding powers of 2 modulo the identified domain size SIZEL that represents value V). For example, when SIZEL is equal to $10^{10}$, engine 80 may represent value V as $V=[(2^{88}*V_{11}) \% 10^{10}]+[(2^{80}*V_{10}) \% 10^{10}]+ \ldots +[(2^{8}*V_1) \% 10^{10}]+[(2^{0}*V_0) \% 10^{10}]$.

At step 106, engine 80 may partition the linear combination generated at step 104 into a first larger sum portion and a second smaller sum portion. The smaller sum portion may include the smallest terms from the linear combination representing value V that may be computed using modulo, multiply, and addition operations without generating a data overflow (e.g., terms that may be computed using a 64-bit computing system), whereas the larger sum portion may include the remaining terms from the linear combination (e.g., terms that would generate an overflow in a 64-bit computing system). For example, engine 80 may identify that the $V_1$ through $V_7$ terms of the linear combination identified at step 104 (and corresponding modulo, multiply, and addition operations) do not generate an overflow and may thereby include the $V_1$ through $V_7$ terms in the smaller sum portion, whereas the $V_8$ through $V_{11}$ terms may be included in the larger sum portion.

At step 108, engine 80 may compute the smaller sum portion identified at step 106 normally (e.g., using standard modular division, multiply, and addition operations), as these operations will not generate a data overflow. In the example where the smaller sum portion included the $V_1$ through $V_7$ terms of the linear combination of step 104, engine 80 may compute $[(2^{56}*V_7) \% 10^{10}]+[(2^{48}*V_6) \% 10^{10}]+ \ldots +[(2^{8}*V_1) \% 10^{10}]+[(2^{0}*V_0) \% 10^{10}]$ and may output the computed value as a computed smaller sum value without generating any data overflow.

At step 110, engine 80 may compute the larger sum portion identified at step 106 to output a computed larger sum value without generating any overflow. Engine 80 may perform additional processing operations on each of the terms of the larger sum portion that reduce the computational difficulty associated with computing each term of the larger sum portion such that a 64-bit computing system (or any other desired processing-limited computing system) can compute the larger sum portion without generating data overflows.

At step 112, engine 80 may add the computed larger sum value (e.g., as generated at step 110) with the computed smaller sum value (e.g., as generated at step 108) to generate a final added value VF. Engine 80 may perform a final modulo operation on the final added value VF by the domain size of left portion $L_1$ (e.g., $10^{10}$) to generate scaled value SK1 having a suitable domain size such that value SK1 can be combined with left portion $L_1$ using format preserving combination circuitry 48 (e.g., engine 80 may compute SK1=VF % $10^{10}$).

Figure 9:
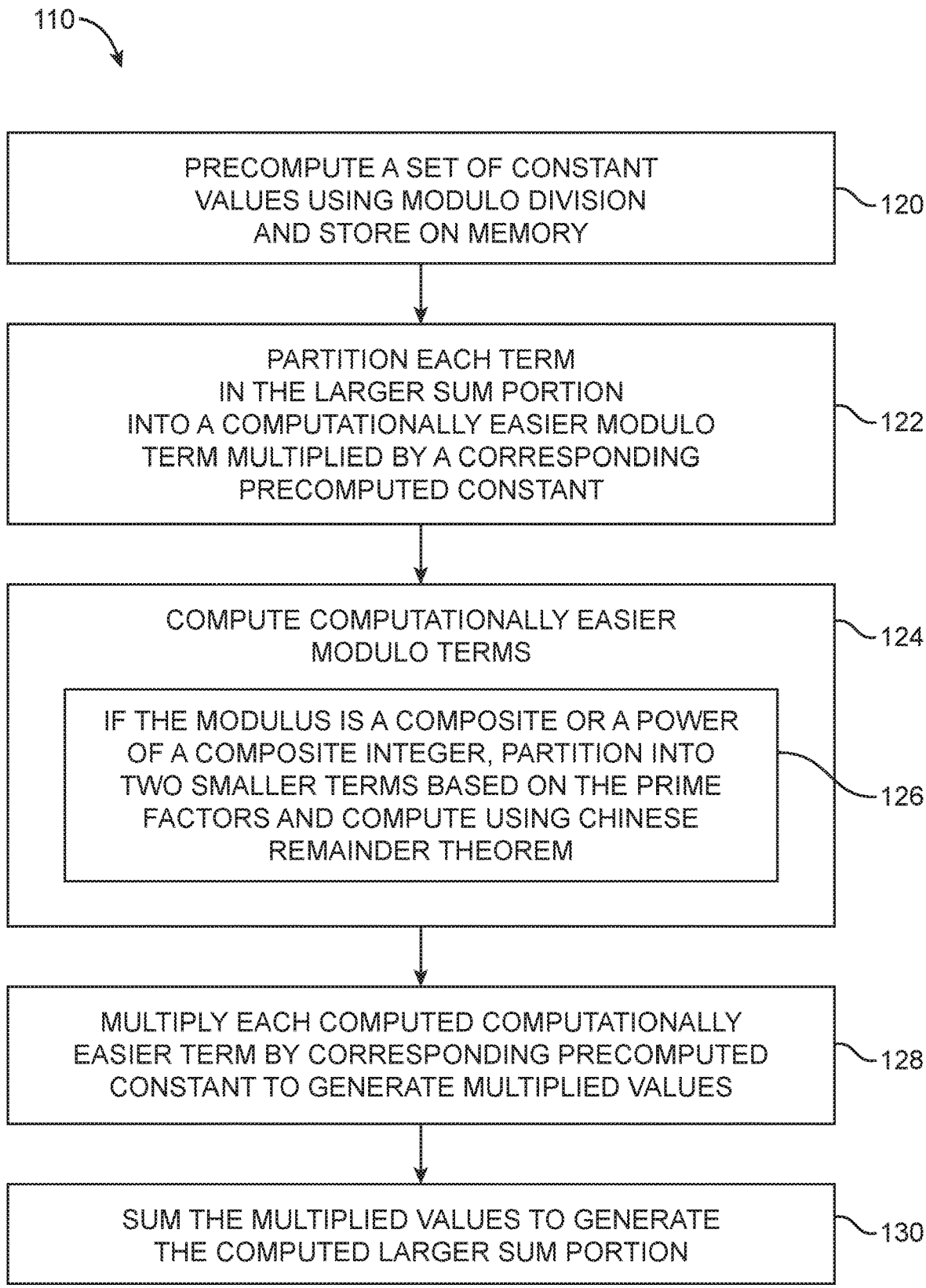

FIG. 9 is a flow chart of illustrative steps that may be performed by modulo operations engine 80 to compute the larger sum portion identified at step 106 of FIG. 8 (e.g., the portion of the linear combination representing value V that would generate an overflow in a 64-bit computing system if performed without any additional processing). The steps of FIG. 9 may, for example, be performed while processing step 110 of FIG. 8.

At step 120, engine 80 may precompute a set of constant values using modulo operations and may store the precomputed values on memory (e.g., memory 15 of FIG. 1). The example of FIG. 9 is merely illustrative. If desired, step 120 may be performed at any desired time prior to step 110 of FIG. 8. By precomputing constant values, the precomputed values may be called during normal processing operations without the need to generate potentially computation-intensive values in real time.

At step 122, engine 80 may partition each term in the larger sum portion into a computationally easier modulo term (modulo factor) multiplied by a corresponding precomputed constant value. The precomputed constant values may be values that were precomputed while processing step 120. For example, engine 80 may partition (rewrite) the $V_{11}$ term $(V_{11}*2^{88}) \% 10^{10}$ from the larger sum portion as two multiplied terms $(V_{11} \% 10^{10})*(2^{88} \% 10^{10})$, where the first term $(V_{11} \% 10^{10})$ is computationally easier to compute than the original modulo operation $(V_{11} * 2^{88}) \% 10^{10}$, and the second term $(2^{88} \% 10^{10})$ is merely a constant value that may be precomputed in advance (e.g., at step 120). The second term may be obtained by calling a corresponding precomputed constant value from memory without the need to re-compute the value. Similarly, engine 80 may rewrite the $V_{10}$ term as $(V_{10} \% 10^{10})*(2^{80} \% 10^{10})$, where the first term $(V_{10} \% 10^{10})$ is computationally easier to compute than the original modulo operation $(V_{11} * 2^{80}) \% 10^{10}$, and the second term $(2^{80} \% 10^{10})$ is merely a constant value that may be precomputed in advance, etc.

At step 124, engine 80 may compute the computationally easier modular division term for each of the terms of the larger sum portion. For example, engine 80 may compute $(V_{11} \% 10^{10})$, may compute value $(V_{10} \% 10^{10})$, etc. In some scenarios, one or more of the computationally easier modular division terms may still generate an overflow on the computing system associated with engine 52 (e.g., a 64-bit system).

If desired, at step 126, the output size adjustment engine may further partition each term of the linear combination of terms that will generate data overflows into first and second data portions and may perform a Chinese Remainder Theorem algorithm on the first and second portions to compute that modulo factor (e.g., to mitigate data overflows). For example, if the modulus is a composite or a power of a composite integer, the terms may be partitioned into smaller terms based on the prime factors and compute using the Chinese Remainder Theorem. In other words, the output size adjustment engine may partition the modulo factor into two or more relatively prime factors, perform the previous pre-computation operations based on the smaller modulus factors instead of the larger whole modulus, generate size-adjusted values based on the modulus factors, and then combine them using the Chinese Remainder Theorem to obtain a size-adjusted output value for the original modulus.

In general, the Chinese Remainder Theorem determines a number that, when divided by given divisors, provides corresponding remainder values. Processing circuitry on engine 80 that implements the Chinese Remainder Theorem may take as inputs the two simpler terms and may output the modulo value that would have been computed by performing the modulo operation prior to reducing to the two simpler terms if sufficient computational power had been available. As an example, when the computationally easier modular division term is $(V_{11} \% 10^{10})$ would generate an overflow, engine 80 may reduce the $(V_{11} \% 10^{10})$ to two simpler operations $(V_{11} \% 2^{10})$ and $(V_{11} \% 5^{10})$ that can be handled by engine 80 without generating overflow when fed through the Chinese Remainder Theorem. These computed values may be input to the Chinese Remainder Theorem to retrieve the value $(V_{11} \% 10^{10})$ without generating overflow. By splitting computationally difficult modulo operations into a greater number of computationally simpler modulo operations and utilizing the Chinese Remainder Theorem, engine 80 may be able to perform the operations without generating overflow (e.g., the Chinese Remainder Theorem may enable the system to generate the desired modulo terms without generating data overflow). By offloading processing time and energy to precompute some of the larger sum portion and creating easier modulo operations to perform, engine 80 may simplify the computational complexity required to compute the larger sum portion such that a computationally limited (e.g., 64-bit) computing system may perform the sum without generating a data overflow.

At step 128, engine 80 may multiply each of the computed computationally easier modulo terms (e.g., as generated at step 124) with a corresponding one of the pre-computed terms (e.g., as generated at step 122) to generate multiplied values. For example, engine 80 may multiply the value $(V_{11} \% 10^{10})$ as computed at step 124 (e.g., using the Chinese Remainder theorem or without using the Chinese Remainder theorem if the terms are sufficiently small) by the associated precomputed value $(2^{88} \% 10^{10})$ to generate a corresponding multiplied value, may multiply the value $(V_{10} \%) \ 10^{10}$ as computed at step 124 by the associated precomputed value $(2^{80} \% 10^{10})$, etc. This process may be repeated for each term of the larger sum portion.

At step 130, engine 80 may sum each of the multiplied values generated at step 128 to generate the computed larger sum portion that is combined with the computed smaller sum portion at step 112 of FIG. 8. In this way, engine 80 may take a computationally difficult problem and reduce it to a greater number of computationally simpler problems. While there may be a greater number of computationally simpler problems to solve, computing the computationally simpler problems may be performed without generating data overflow, thereby avoiding overflow errors when generating scaled value SK1 having the desired domain size for combining with left portion $L_1$.

The example of FIGS. 4-8 are merely illustrative. In general, the arrangement of FIGS. 4-8 may be applied to each of the rounds of FIG. 3 (e.g., where string $R_1$ replaces string $L_1$ for second round 42, etc.). These processes may be reversed to perform a corresponding decryption operation. Engines 50 and 52 of FIG. 4 may be implemented on dedicated processing circuits (e.g., one or more integrated circuits) or may be implemented on common processing circuitry. If desired, engines 50 and 52 may be implemented in hardware and/or software running on computing equipment 12. Engines 70, 72, 74, 76, and 80 of FIG. 6 may be implemented on dedicated processing circuits and/or on common processing circuitry. In general, software and data may be stored on any computer-readable medium (storage) in computing equipment 12 such as memory 15 of FIG. 1.

Figure 10:
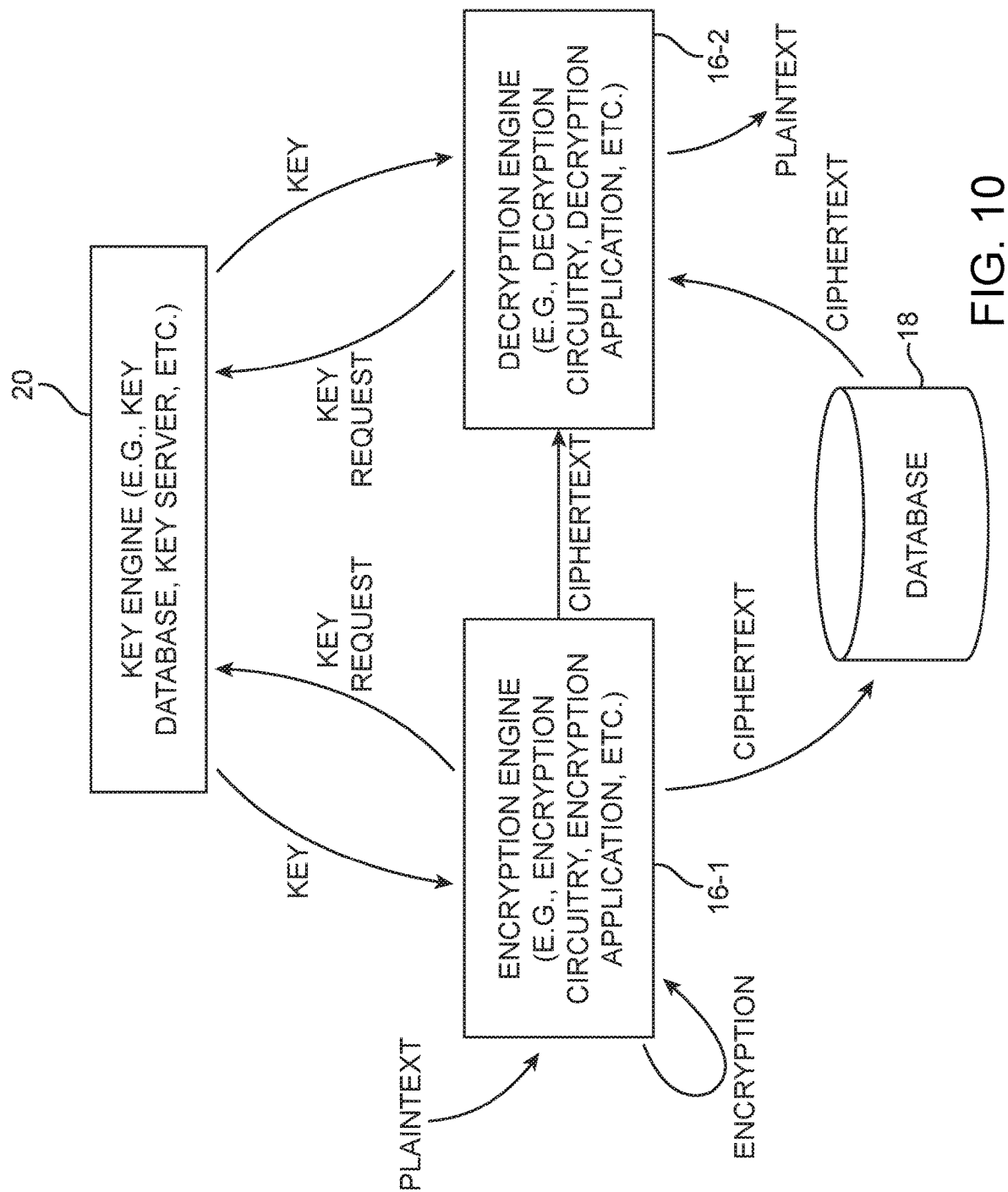
FIG. 10 is a diagram of an illustrative system in which format-preserving encryption and decryption operations are performed in accordance with an embodiment of the present invention.

FIG. 10 is a diagram showing how plaintext and ciphertext may be processed using the techniques described above in connection with FIGS. 1-9. As shown in FIG. 10, a first application 16-1 may receive plaintext such as a credit card number, social security number, etc. The plaintext may be manually input into application 16-1 by an operator, may be received from another application, etc.

Application 16-1 encrypts the plaintext to form ciphertext (e.g., using cryptographic operations as described above in connection with FIGS. 2-9). As indicated by line 144, application 16-1 may request a copy of a key K from key server 20. If application 16-1 is authorized, key server 20 will provide the requested key K to application 16-1. Application 16-1 encrypts the plaintext using encryption engine 26 and key K to produce ciphertext (e.g., using one or more rounds of encryption and scaling).

Application 16-1 can store the ciphertext in database 18 for subsequent retrieval by application 16-2. Alternatively, application 16-1 can provide the ciphertext to application 16-2 directly (line 154). Application 16-2 requests an appropriate key K for decrypting the ciphertext. If authorized, key server 20 provides the requested key to application 16-2. The key is used in decryption engine 28 by application 16-2 to decrypt the ciphertext, producing plaintext. The plaintext may be used by application 16-2 or other applications in system 10 to which application 16-2 provides the plaintext.

The foregoing is merely illustrative of the principles of this invention and various modifications can be made by those skilled in the art without departing from the scope and spirit of the invention. The foregoing embodiments may be implemented individually or in any combination.

What is claimed is:

1. A method of mitigating data overflows while performing format-preserving cryptographic operations using computing equipment having storage circuitry, a cryptographic engine, and a data size adjustment engine, the method comprising:
with the computing equipment, storing a set of pre-computed constant values on the storage circuitry including a first pre-computed constant value and a second pre-computed constant value;
with the data size adjustment engine, obtaining an extracted data string from the cryptographic engine and partitioning the extracted data string into a plurality of string portions including a first portion and a second portion;
with the data size adjustment engine, retrieving the stored set of pre-computed constant values from the storage circuitry; and
with the data size adjustment engine, combining the first pre-computed constant value with the first portion to generate a first size-adjusted output value and combining the second pre-computed constant value with the second portion to generate a second size-adjusted value, wherein the first size-adjusted output value and the second-size-adjusted value are generated based on a given size.

2. The method defined in claim 1, further comprising:
performing a format-preserving combination operation on the first size-adjusted output value and an input string to generate a modified string.

3. The method defined in claim 2, wherein the input string comprises a plaintext string and the modified string comprises a ciphertext string.

4. The method defined in claim 2, wherein the input string comprises a ciphertext string and the modified string comprises a plaintext string.

5. The method defined in claim 2, further comprising:
with the computing equipment, partitioning a given string into the input string and a data string;
with the cryptographic engine, performing a pseudorandom operation on the data string using a cryptographic key to generate an output value; and
with the computing equipment, extracting a predetermined number of digits from the output value to generate the extracted data string.

6. The method defined in claim 5, wherein extracting the predetermined number of digits from the output value to generate the extracted data string comprises:
identifying a domain size of the input string; and
identifying the predetermined number of digits to extract from the output value based on the identified domain size of the input string.

7. The method defined in claim 6, wherein identifying the predetermined number of digits to extract from the output value comprises:
generating a first value by performing a logarithm operation on the identified domain size of the input string;
generating a first rounded value by rounding the first value to a next highest integer;
identifying a constant value;
generating a second rounded value by rounding the first rounded value to a next highest integer multiple of the identified constant value; and
identifying the predetermined number of digits to extract from the output value by adding the second rounded value to the identified constant value.

8. The method defined in claim 1, wherein storing the set of pre-computed constant values comprises:
performing modulo division operations to generate the set of pre-computed constant values.

9. The method defined in claim 1, wherein partitioning the extracted data string into the plurality of string portions comprises partitioning the extracted data string into a first set of string portions and a second set of string portions that is larger than the first set of string portions.

10. The method defined in claim 9, wherein combining the first pre-computed constant value with the first portion to generate the first size-adjusted output value and combining the second pre-computed constant value with the second portion to generate the second size-adjusted value comprises:
partitioning the second set of string portions into a plurality of modulo terms each multiplied by a respective one of the retrieved stored set of pre-computed constant values;
computing each modulo term of the plurality of modulo terms;
multiplying each of the computed plurality of modulo terms by the respective one of the retrieved stored set of pre-computed constant values to generate multiplied values;
summing the multiplied values to generate a summed value; and
adding the summed value to the first set of string portions to generate the first size-adjusted output value.

11. The method defined in claim 10, wherein computing each modulo term of the plurality of modulo terms comprises:
partitioning a given modulo term of the plurality of modulo terms into first and second modulo portions; and
performing a Chinese Remainder Theorem operation on the first and second modulo portions to compute the given modulo term.

12. A method of performing encryption operations using computing equipment having an encryption engine, a data extraction engine, and an output size adjustment engine, the method comprising:
with the computing equipment, partitioning an input plaintext string into a first plaintext portion and a second plaintext portion, wherein the first plaintext portion has a given domain size;
with the output size adjustment engine, generating a size-adjusted output value based on the given domain size by performing size adjustment operations on an extracted value, wherein the extracted value is generated by the encryption engine and the data extraction engine based on encrypting the second plaintext portion; and
with the computing equipment, performing format-preserving combination operations on the size-adjusted output value and the first plaintext portion to generate a ciphertext string, wherein performing the size adjustment operations comprises:
mitigating data overflow while performing the size adjustment operations by partitioning at least some of the extracted value into a linear combination of terms, wherein each term of the linear combination of terms includes a modulo factor multiplied by a corresponding pre-computed constant value.

13. The method defined in claim 12, further comprising:
with the encryption engine, generating an output value from the encrypting the second plaintext portion using an encryption key; and
with the data extraction engine, identifying a predetermined number of digits based on the given domain size and generating the extracted value by extracting the predetermined number of digits from the output value.

14. The method defined in claim 12, further comprising:
with the computing equipment, performing modulo divide operations to generate pre-computed constant values including the corresponding pre-computed constant value; and
storing the generated pre-computed constant values on storage circuitry at the computing equipment.

15. The method defined in claim 12, wherein performing the size adjustment operations further comprises:
computing each modulo factor in each term of the linear combination of terms, wherein each modulo factor is based on the domain size;
multiplying each computed modulo factor in each term of the linear combination of terms by the corresponding pre-computed constant value; and
summing each term in the linear combination of terms to generate a summed value and adding the summed value with a portion of the extracted value that is different from the linear combination of terms to generate the size-adjusted output value.

16. The method defined in claim 15, wherein computing each modulo factors in each term of the linear combination of terms comprises:
partitioning a term of the linear combination of terms that will generate a data overflow into first and second portions; and
performing a Chinese Remainder Theorem algorithm on the first and second portions to compute a modulo factor of the term of the linear combination of terms that will generate the data overflow.

17. The method defined in claim 12, wherein the input plaintext string comprises a credit card number.

18. The method defined in claim 12, wherein the first plaintext portion comprises a first half of the input plaintext string and the second plaintext portion comprises a second half of the input plaintext string.

19. A method of performing decryption operations using computing equipment having a decryption engine, a data extraction engine, and an output size adjustment engine, the method comprising:
with the computing equipment, partitioning an input ciphertext string into a first ciphertext portion and a second ciphertext portion, wherein the first ciphertext portion has a given domain size;
with the output size adjustment engine, generating a size-adjusted output value based on the given domain size by performing size adjustment operations on an extracted value, wherein the extracted value is generated by the decryption engine and the data extraction engine based on decrypting the second ciphertext portion; and
with the computing equipment, performing format-preserving combination operations on the size-adjusted output value and the first ciphertext portion to generate a plaintext string, wherein performing the size adjustment operations comprises:
mitigating data overflow by partitioning at least some of the extracted value into a linear combination of terms, wherein each term of the linear combination of terms includes a modulo factor multiplied by a corresponding pre-computed constant value, and wherein the output size adjustment engine generates the size-adjusted output value by computing the linear combination of terms and adding the linear combination of terms to a portion of the extracted value that is different from the linear combination of terms.

20. The method defined in claim 19, further comprising:
with the decryption engine, generating an output value from the decrypting the second ciphertext portion using a decryption key; and
with the data extraction engine, identifying a predetermined number of digits based on the given domain size and generating the extracted value by extracting the predetermined number of digits from the output value.

* * * * *